United States Patent [19]

Laveran

[11] Patent Number: 5,785,115
[45] Date of Patent: Jul. 28, 1998

[54] DEVICE FOR FIXING A HEAT EXCHANGER OPERATING AT HIGH TEMPERATURE

[75] Inventor: Jean-Louis Laveran, Asnieres S/Seine, France

[73] Assignee: Valeo Thermique Moteur, Le Mesnil Saint Denis, France

[21] Appl. No.: 724,831

[22] Filed: Oct. 3, 1996

[30] Foreign Application Priority Data

Oct. 6, 1995 [FR] France .................... 95 11817

[51] Int. Cl.[6] ................................ F28F 9/00
[52] U.S. Cl. ............... 165/67; 165/82; 165/149; 248/635
[58] Field of Search .............. 165/67, 149, 81, 165/82, 83; 248/635

[56] References Cited

U.S. PATENT DOCUMENTS

| | | | |
|---|---|---|---|
| 2,361,184 | 10/1944 | Ellis et al. | 248/635 |
| 4,519,467 | 5/1985 | Saunders | 165/67 X |
| 4,520,987 | 6/1985 | Eguchi et al. | 248/635 |
| 4,678,026 | 7/1987 | Lenz et al. | 165/67 |
| 5,127,466 | 7/1992 | Ando | 165/67 |
| 5,139,080 | 8/1992 | Bolton et al. | 165/67 |
| 5,172,762 | 12/1992 | Shinmura et al. | 165/67 X |
| 5,323,848 | 6/1994 | Naty et al. | 165/67 X |
| 5,460,348 | 10/1995 | Cox | 248/635 |
| 5,509,276 | 4/1996 | O'Brien | 165/149 X |
| 5,535,819 | 7/1996 | Matsuura | 165/149 |
| 5,566,748 | 10/1996 | Christensen | 165/149 X |

FOREIGN PATENT DOCUMENTS

| | | | |
|---|---|---|---|
| 0353128 | 1/1990 | European Pat. Off. | 165/149 |
| 0 440 400 | 1/1991 | European Pat. Off. | |
| 0 494 353 | 7/1992 | European Pat. Off. | |
| 0095389 | 6/1984 | Japan | 165/81 |
| 0243492 | 12/1985 | Japan | 165/67 |
| 0230098 | 10/1991 | Japan | 165/67 |
| 79.00967 | 3/1979 | WIPO | |

Primary Examiner—Ira S. Lazarus
Assistant Examiner—Christopher Atkinson
Attorney, Agent, or Firm—Morgan & Finnegan L.L.P.

[57] ABSTRACT

A fixing lug provided on a fluid chamber of the heat exchanger has an elongate opening along which there is able to slide a bolt ensuring the clamping of the lug on a receiving lug. This sliding enables the heat exchanger to expand without mechanical stress.

12 Claims, 1 Drawing Sheet

DEVICE FOR FIXING A HEAT EXCHANGER OPERATING AT HIGH TEMPERATURE

FIELD OF THE INVENTION

The invention concerns a device for fixing to a support of a heat exchanger designed to have fluid pass through it at high temperature, notably for fixing, to the chassis and/or bodywork of a vehicle, a radiator for cooling the booster air for the thermal engine of this vehicle, the device being distributed over at least two fixing zones at a distance from each other and having in each of these zones at least one contact surface belonging to the support, at least one contact surface belonging to the exchanger and a clamping appliance suitable for applying one of the said contact surfaces against the other, with the optional interposing of at least one intermediate element.

BACKGROUND OF THE INVENTION

The known devices of this type have the effect of immobilising the respective contact surfaces of the heat exchanger and of the support with respect to each other in all the fixing zones. As a result, when there is thermal expansion of the heat exchanger during its operation, there are mechanical stresses which may result in permanent deformation or rupture of components or welds.

The aim of the invention is to remedy these drawbacks.

DISCUSSION OF THE INVENTION

The invention relates notably to a device for fixing to a support of a heat exchanger designed to have fluid pass through it at high temperature, notably for fixing, to the chassis and/or bodywork of a vehicle, a radiator for cooling the booster air for the thermal engine of this vehicle, the device being distributed over at least two fixing zones at a distance from each other and having in each of these zones at least one contact surface belonging to the support, at least one contact surface belonging to the exchanger and a clamping appliance suitable for applying one of the said contact surfaces against the other, with the optional interposing of at least one intermediate element and makes provision for it to offer, in at least one of the fixing zones, referred to as the sliding zone, a possibility of relative sliding of the contact surfaces of the support and exchanger, thus making it possible to absorb the thermal expansion of the exchanger without excessive mechanical stress.

Optional characteristics of the device according to the invention, complementary or alternative, are set out below:

- The heat exchanger comprising at least one elongate fluid chamber through which the fluid enters the exchanger and/or leaves it, communicating with at least one row of fluid circulation tubes aligned in the longitudinal direction of the fluid chamber and extending transversely to the latter, it has two fixing zones situated in the vicinity of the fluid chamber and mutually distant in the longitudinal direction thereof, and offers in one of these fixing zones a possibility of relative sliding in the longitudinal direction of the fluid chamber.

- The heat exchanger comprising two elongate parallel fluid chambers through which the fluid enters the exchanger and leaves it, connected together by at least one row of fluid circulation tubes aligned in the longitudinal direction of the fluid chambers and extending transversely thereto, it includes two fixing zones situated in the vicinity of the two fluid chambers respectively and offers, in one of these fixing zones, a possibility of relative sliding in the longitudinal direction of the tubes.

- The exchanger being designed to cool a fluid entering it at high temperature through a first fluid chamber and which leaves it again at a substantially lower temperature through the second fluid chamber, it has four fixing zones, including three sliding zones, situated in pairs in the vicinity of the two fluid chambers respectively and mutually distant in the longitudinal direction of the latter, the relative sliding taking place in the longitudinal direction of the fluid chambers, for one of the sliding zones, adjacent to the first of these, and in the longitudinal direction of the tubes for the other two sliding zones, adjacent to the second fluid chamber.

- It comprises, in each sliding zone, a lug projecting from the wall of the corresponding fluid chamber, one of the faces of which defines a contact surface of the exchanger and in which is provided an opening through which a clamping appliance such as a bolt passes, fixed with respect to the support, the said opening being elongate in the direction of sliding in order to enable the clamping appliance to move therein with respect to the lug.

- The clamping appliance affords the clamping of a stack comprising, in the following order, a fixing lug secured to the support, a first intermediate element in the form of a washer, the said lug of the fluid chamber and a second intermediate element in the form of a washer.

- Each intermediate washer comprises, juxtaposed in the direction of the stack, an outer region of width greater than the width of the elongate opening, which bears on the corresponding face of the lug of the fluid chamber, and an internal region of width slightly less than the width of the opening, which enters the opening and provides guidance of the clamping appliance along it.

- It comprises, in at least one fixing zone, a lug projecting from the wall of the corresponding fluid chamber, and means for fixing this lug with respect to the support without any possibility of sliding.

- The said lugs all extend in the same mid-plane of the heat exchanger, parallel to the longitudinal directions of the fluid chambers and of the tubes, and substantially orthogonally to the walls of the fluid chambers.

- The intermediate elements are made from a material with a low coefficient of friction and good resistance to compression.

Another object of the invention is a heat exchanger comprising at least two contact surfaces distant from each other, suitable for forming part of a device as defined above, at least one of the said contact surfaces being able to slide with respect to a contact surface belonging to a support when it is applied against it with the optional interposing of at least one intermediate element.

The said contact surface is advantageously defined by one of the faces of a lug projecting from the wall of a fluid chamber, in which there is formed an opening suitable for having a clamping appliance such as a bolt pass through it, the said opening being elongate in the direction of sliding in order to enable the clamping appliance to move therein with respect to the lug.

BRIEF DESCRIPTION OF THE DRAWINGS

The characteristics and advantages of the invention will be set out in more detail in the following description, with reference to the accompanying drawings, in which.

DESCRIPTION OF THE PREFERRED EMBODIMENT

Figure 1:
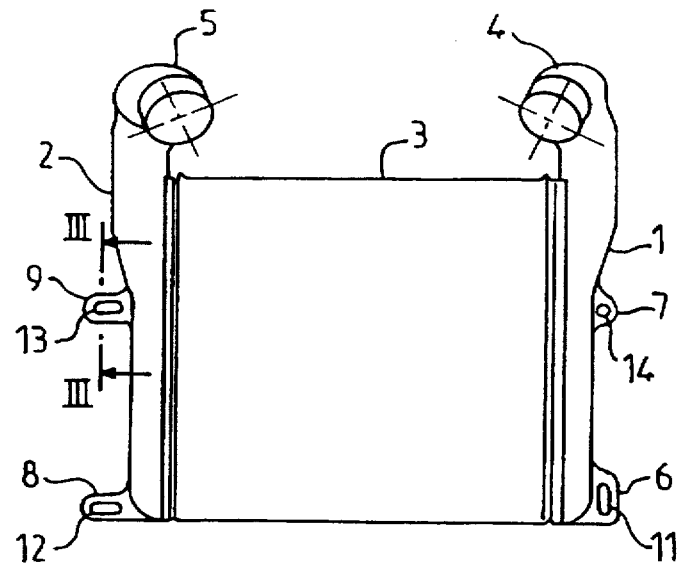
FIG. 1 is a view in elevation of a heat exchanger according to the invention.

FIG. 1 depicts a radiator for cooling booster air for the thermal engine of a motor vehicle, comprising in a conventional manner an inlet fluid chamber 1, an outlet fluid chamber 2 and a bank of tubes 3. The two fluid chambers are elongate in the same direction, vertical in the figure, and are connected at their top end respectively to an inlet manifold 4 and to an outlet manifold 5 for the air to be cooled. The bank 3, of rectangular parallelepipedal shape overall, extends from one of the fluid chambers to the other and includes a multiplicity of tubes, not shown individually, elongate horizontally and mutually aligned from top to bottom in the figure, the two ends of each tube opening out respectively into the two fluid chambers. Thus the air to be cooled can pass from the fluid chamber 1 to the fluid chamber 2 by flowing in parallel through the different tubes in the bank 3, where it is cooled by an air current passing through the latter perpendicularly to the plane of the figure.

Each of the fluid chambers has two fixing lugs marked 6 and 7 for the fluid chamber 1, and 8 and 9 for the fluid chamber 2. These lugs are for example cast in a single piece with the aluminium alloy fluid chambers, so as to extend along the mid-plane of the heat exchanger, parallel to the plane of FIG. 1, whilst projecting orthogonally with respect to the wall 10 (FIG. 2) of each fluid chamber, the opposite way to the other fluid chamber. The lugs 6 and 8 are adjacent to the ends of the fluid chambers opposite to the manifolds 4 and 5, and the lugs 7 and 9 are distant from the lugs 6 and 8 in the direction of these manifolds.

According to the invention, the lug 6 on the fluid chamber 1 and the lugs 8 and 9 on the fluid chamber 2 have respective elongate holes 11, 12 and 13 passing through them. The hole 11 is elongate in the longitudinal direction of the fluid chambers, and the holes 12 and 13 in the longitudinal direction of the tubes in the bank 3. As for the lug 7, this has a circular hole 14 passing through it, which is both substantially in line with the hole 11 and in line with the hole 13.

Figure 2:
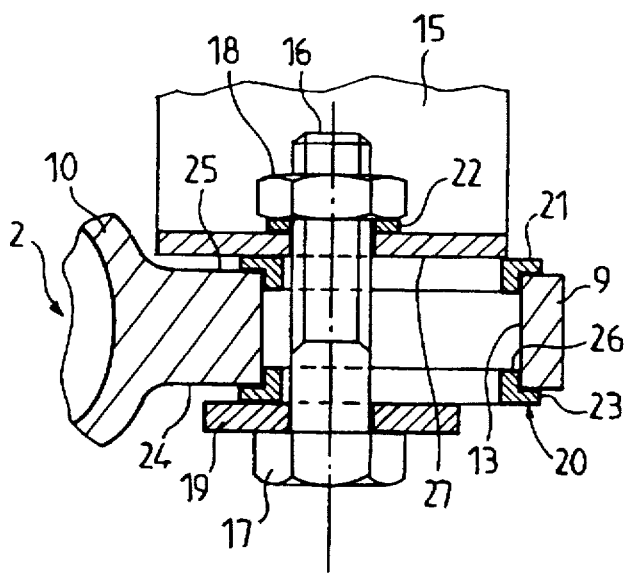
FIGS. 2 and 3 are partial views in section respectively along the line II—II in FIG. 3 and along the line III—III in FIG. 1, of a fixing device for the exchanger in FIG. 1, limited to a sliding zone.
Figure 3:
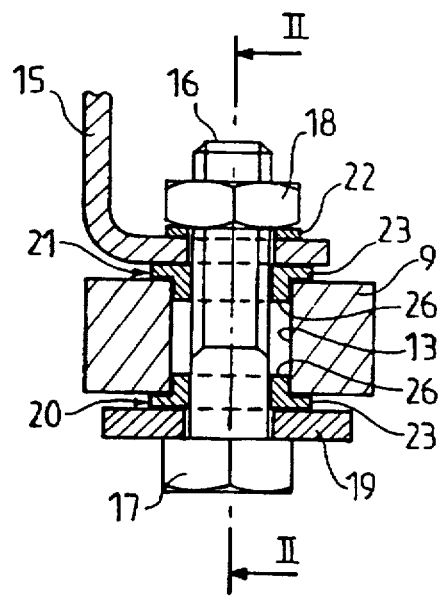

As FIGS. 2 and 3 show by way of example for the lug 9, each of the lugs 6 to 9 is designed to be applied against a lug 15 secured to the chassis or bodywork of the vehicle for fixing the heat exchanger. This fixing is achieved by means of a bolt 16, the shank of which passes through the hole 13 and which clamps, between its head 17 and its nut 18, a stack composed, in this order, of a steel washer 19, a first intermediate washer 20, the lug 9, a second intermediate washer 21, the lug 15 and a nut locking washer 22. Each of the intermediate washers 20 and 21 is annular in shape and has an L-shaped section comprising an outer leg 23 which is clamped between the washer 19, or the lug 15, and the opposite face 24, 25 of the lug 9, and an inner leg 26 substantially adjacent to the wall of the hole 13. The intermediate washers 20 and 21 are produced for example from sintered alloy soaked in oil, so as to have a low coefficient of friction and high resistance to compression. The lug 7 can be fixed in a conventional manner by virtue of its circular hole 14.

When the different parts of the heat exchanger are in thermal equilibrium, the bolt 16 ensures the mutual immobilisation of all the components through which it passes, and in particular the lugs 9 and 15. The lugs 6 and 8 are immobilised in the same way, and the lug 7 in a conventional manner, with respect to the chassis of the vehicle, which ensures stable fixing of the heat exchanger.

The commencement and stoppage of the operation of the engine, and the changes in speed, cause a differential expansion of the different parts of the heat exchanger. The fluid chamber 1, by which the air to be cooled enters, may for example be raised to 180° C., and the fluid chamber 2, by which the cooled air leaves, to 75° C. This gives rise to a significant variation on the one hand in the length of the fluid chamber 1 and on the other hand in the distance between the two fluid chambers, compared with the idle state at ambient temperature. The lug 6 therefore has a tendency to move away from the lug 7, and the lugs 8 and 9 respectively from the lugs 6 and 7. These movements are permitted by the device according to the invention, the lug 9 being for example able to slide, accompanied by the intermediate washers 20 and 21, with respect to the washer 19 and to the contact surface 27 of the lug 15, which are secured to the bolt 16, the shank of the latter moving along the hole 13.

Since the temperature variations are less great with the fluid chamber 2 than with the fluid chamber 1, it is not necessary, in the example described, to make provision for any possibility of sliding of the lugs 8 and 9 in the longitudinal direction of the fluid chambers.

What is claimed is:

1. A device for fixing a heat exchanger to a support, the device comprising:
   at least two spaced apart fixing zones, the device including in each of the zones a first contact surface belonging to the support, a second contact surface belonging to the exchanger and a clamping appliance suitable for securing the first and second contact surfaces to each other; and
   at least one intermediate element inteposed between the first and second contact surfaces within at least one of the fixing zones to provide relative sliding of the first and second contact surfaces separated by the intermediate element to absorb thermal expansion of the exchanger.

2. The device according to claim 1, wherein the heat exchanger comprises at least one elongate fluid chamber through which fluid may communicate with the exchanger, wherein two of the fixing zones are situated in proximity to the fluid chamber and mutually distant in a longitudinal direction thereof, wherein one of the two fixing zones situated in proximity to the fluid chamber provides relative sliding of the first and second contact surfaces in the longitudinal direction of the fluid chamber.

3. The device according to claim 1, wherein the heat exchanger comprises first and second elongate parallel fluid chambers through which fluid may communicate with the exchanger, wherein two of the fixing zones are situated in proximity to the two fluid chambers respectively, at least one of the fixing zones situated in proximity to the fluid chambers providing relative sliding of the first and second contact surfaces in a direction perpendicular to a longitudinal axis of the fluid chambers.

4. The device according to claim 3, wherein the exchanger is designed to cool a fluid entering the exchanger at high temperature through the first fluid chamber, which fluid leaves the exchanger at a substantially lower temperature through the second fluid chamber, wherein the device comprises first, second, third and fourth fixing zones, the first and second fixing zones situated in proximity to and spaced apart along the longitudinal axis of the first chamber, the third and fourth fixing zones situated in proximity to and spaced apart along the longitudinal axis of the second chamber, wherein the first and second contact surfaces within the second fixing zone are adapted to slide relative one another in the longitudinal direction of the first chamber, and wherein the first and second contact surfaces within the third and fourth fixing zones, respectively, are adapted to slide relative one another in a direction perpendicular to the longitudinal axis of the second chamber.

5. The device according to claim 4, comprising in each of the second, third and fourth sliding zones a lug projecting from a wall of the corresponding fluid chamber, wherein one of the faces of said lug defines a contact surface of the exchanger and has an opening through which the clamping appliance passes, said lug being fixed with respect to the support, and the opening being elongate in the direction of sliding to permit the clamping appliance to move therein with respect to the lug.

6. The device according to claim 5, wherein the clamping appliance affords the clamping of a stack comprising, in the following order, a fixing lug secured to the support, a first intermediate element, the lug projecting from the wall of the corresponding fluid chamber and a second intermediate element.

7. The device according to claim 6, wherein each intermediate element comprises, juxtaposed in the direction of the stack, an outer region of width greater than the width of the elongate opening, which bears on the corresponding face of the lug of the fluid chamber, and an internal region of width slightly less than the width of the opening, which enters the opening and provides guidance of the clamping appliance along it.

8. The device according to claim 5, comprising, in at least one fixing zone, a lug projecting from the wall of the corresponding fluid chamber, and means for non-slidingly fixing the lug to the support.

9. The device according to claim 5, wherein the lug projecting from the corresponding chamber in each of the second, third and fourth fixing zones extend in the same mid-plane of the heat exchanger, parallel to the longitudinal directions of the fluid chambers, and substantially orthogonally to the wall of each of the fluid chambers.

10. The device according to claim 1, wherein the intermediate element is made from a material with a low coefficient of friction and good resistance to compression.

11. A heat exchanger comprising at least two contact surfaces distant from each other, suitable for forming part of the device according to one of the preceding claims, wherein at least one of the contact surfaces is able to slide with respect to a contact surface belonging to a support when it is fixed to the contact surface of the support, with the interposing of the at least one intermediate element.

12. The heat exchanger according to claim 11, wherein the contact surface is defined by one of the faces of the lug projecting from the wall of the fluid chamber, the lug having an opening suitable for a clamping appliance to pass through it, the opening being elongate in the direction of sliding in order to enable the clamping appliance to move therein with respect to the lug.

* * * * *